Dec. 19, 1939.  W. J. VOIT ET AL  2,183,900
INFLATION VALVE
Filed Jan. 10, 1938
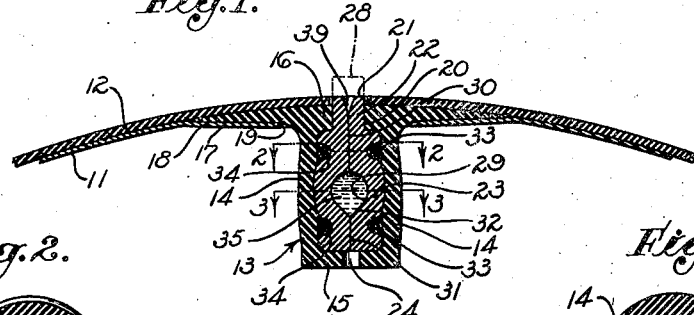
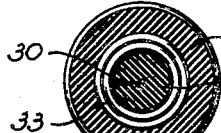
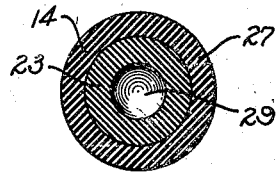
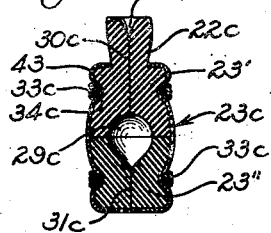
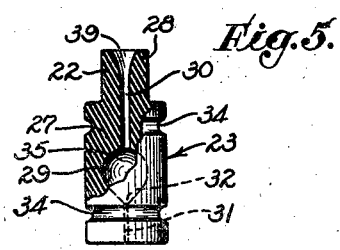
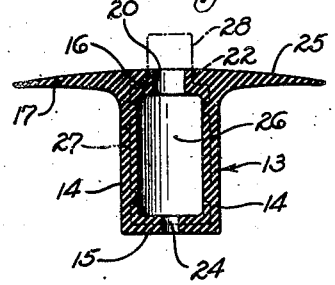
INVENTORS
WILLIAM J. VOIT
LEITH C. WEIMER
BY
HARRIS, KIECH, FOSTER & HARRIS
ATTORNEYS Patented Dec. 19, 1939

2,183,900

UNITED STATES PATENT OFFICE 2,183,900

INFLATION VALVE

William J. Voit, Los Angeles, and Leith C. Weimer, Southgate, Calif., assignors, by mesne assignments, to said William J. Voit Application January 10, 1938, Serial No. 184,122

7 Claims. (Cl. 273—65)

This invention relates to an inflatable athletic ball or other inflatable object, and particularly to the inflation valve and its structural relation to the ball.

An object of the invention is to provide a valve which shall be made entirely of rubber or other resilient material.

Another object is to provide a valve and a manner of assembly thereof with the ball which shall effectively prevent the escape of air or other gas of inflation from the interior of the ball.

Another object is to provide a valve and a manner of assembly thereof with the ball which shall be capable of ready and easy operation for the repeated admission and emission of air or other inflating gas to or from the interior of the ball.

Another object is to provide a valve of the kind described which shall be simple in construction, inexpensive to manufacture, and durable under long continued and hard usage.

Another object of our invention is to provide an assembly of valve and ball which shall ensure proper registry of the one with the other, and will present a smooth exterior surface devoid of exposed metallic elements or projections of any kind.

Another object is to provide a valve structure of which the operative core shall be readily removable for replacement when worn or rendered inoperative.

Another object is to provide a valve structure which shall be especially adaptable for the inflation of a ball having a continuous one-piece outer wall without opening other than the valve opening.

Embodiments of our invention are shown in the accompanying drawing, of which:

Fig. 1 is a sectional view taken longitudinally of the valve and transversely of the ball along the plane of an arc of one of the great circles of the ball, which plane bisects the valve longitudinally.

Fig. 2 is a cross sectional view taken along the line 2—2 of Fig. 1.

Fig. 3 is a cross sectional view taken along the line 3—3 of Fig. 1.

Fig. 4 is a view in longitudinal section of the valve housing.

Fig. 5 is a side elevational view partly in section of the valve core.

Fig. 6 is a view similar to Fig. 1, but of a modified construction.

Fig. 7 is a view similar to Fig. 1, of a valve and ball, the ball consisting in this form of a single rubber wall without cover of leather, rubber, or other material.

Fig. 8 is a side elevational view partly in section of a modified form of valve core.

Referring to the drawing, the ball shown in Figure 1 has an inner bladder 11, and an outer cover 12 of leather, rubber, or other material. A valve housing 13 has the general form of a hollow cylinder, with a cylindrical side wall 14, a lower end wall 15 and an upper end wall 16. This upper end wall 16 is provided with an annular flange 17 which tapers outwardly in cross section and the under face of which is rigidly secured by vulcanization or adhesive means to the upper face of an inwardly flared annular portion 18 of the bladder 11. This portion 18 has a central aperture 19 in which is concentrically positioned the upper end of the cylindrical wall 14.

The central portion of the upper end wall 16 of the housing, and the outer ball cover 12 have circular aligned openings 20 and 21 respectively in which is snugly fitted neck 22 of a valve core 23. The lower end wall 15 of the housing is formed with a central opening 24, which is axially aligned with the openings 20 and 21. The outer face 25 of the upper wall 16 and flange 17 is of spherical shape with the same degree of curvature as that of the bladder 11.

The valve core 23 is formed with appreciably greater dimensions than the housing cavity 26 in which it is seated, with respect to both its diameter and length as best illustrated in Fig. 4, wherein the valve core is shown in dotted lines. The rubber of the housing is preferably harder than that of the core. The core is assembled with the housing 13, by expanding the opening 20 in the upper end wall 16 of the housing, and inserting the valve core therein. The valve core is generally cylindrical in shape, with a cylindrical body 27 and the cylindrical neck 22. This neck is moulded with a projecting end 28, shown in dotted lines in Fig. 1 which after the parts of the ball are assembled and vulcanized and the core inserted in the vulcanized ball, is cut off flush with the outer surface of the ball cover 12.

The operation of assembling the valve parts and ball can be accomplished in any suitable manner. According to one method, the under face of the flange 17 of the housing is coated with rubber cement, the housing is inserted in the opening 19 of the bladder, and the under face of the flange 17 is brought into contact with the upper face of the portion 18 of the bladder and vulcanized thereto. The bladder 11 and outer surface of flange 17 and upper end wall 18 are then coated with rubber cement, and material of uncured rubber for the cover is applied thereto in such manner as to leave the opening 21 of the cover in registry with the opening 20 of the housing. The bladder, housing, and cover are then preferably vulcanized in a mold into one integral structure. During the vulcanizing operation a suitable inflating tool is inserted in the valve housing to force the outer surface of the ball outwardly against the walls of the vulcanizing mold.

After the ball has been completed the valve core 23 is coated with rubber cement and inserted in the housing through the opening 20 in the upper end wall of the housing. The rubber cement serves to secure the core in position and to prevent the passage of air between the housing and core from the interior of the ball to the outside. When damaged or worn, the core can be removed from the housing and replaced with a new core, since the rubber cement between housing and core has not been vulcanized with heat and readily yields to the severing pull by which the core is extracted from its housing.

If the outer cover 12 is of leather, it is applied in any suitable manner after the core has been then inserted in the housing. The neck 22 of the core is then cut off flush with the outer surface of the cover as before. If an intermediate fabric reinforcing wall is utilized in making the ball, the process of manufacture is modified accordingly. If the ball is made with a removable bladder or center and the outer cover is made of leather, it may be provided with a suitable laced opening through which to insert and remove the center. This opening may be adjacent and communicating with the opening 21 or at any other position in the cover of the ball.

The valve core 23 is cast with a cavity 29 disposed on the longitudinal axis of the core and midway the ends of the core body 27. It is also cast with a normally closed axial bore 30 which extends from the upper end of the neck 22 to the cavity 29. The end of the bore is enlarged at 39 to facilitate the entrance of an inflating needle. Another normally closed axial bore 31, extending from the cavity 29 to the lower end of the core and registering with the opening 24, is preferably formed by piercing the lower portion of the core with a suitable piercing tool inserted through the bore 30 and driven through the lower portion of the core. The cavity 29 is filled with glycerine or a similar viscous liquid 35 for the double purpose of lubricating the inflating needle and sealing the bores 30 and 31 both when the inflating needle is in operative position and during periods of use between inflations. The cavity is generally spherical but is preferably formed with an extension 32 at its lower end to assist in guiding the inflating needle axially centrally through the valve core and opening 24.

Before the core is inserted in the valve housing 13, rubber bands 33 are tightly wound and tied in position in annular grooves 34 formed on the exterior of the core body 27. We prefer to provide two of these grooves, one between the horizontal plane of the cavity 29 and the upper end of the core body, and the other between the horizontal plane of the cavity 29 and the lower end of the core body.

It is obviously important that any valve structure of the type herein described act to prevent the escape of the inflating gas both during the inflating operation and at other times. A ball and valve constructed in accordance with our invention provides ample means for accomplishing this purpose. The valve core, being of normally greater size than the cavity in the housing, is under constriction when assembled in the housing. The bores 30 and 31 which are open prior to insertion of the core in the housing (see Fig. 5) are closed when the core is inserted in the housing except when these bores are occupied by an inflating needle. The rubber bands 33 afford an additional means for constricting the core body. The cavity 29 allows this constrictive action to effect longitudinal movement toward the cavity, of the rubber of the upper and lower axial portions of the core body, which tends to facilitate the closing of the bores 30 and 31. The glycerine or other viscous material 35 acts to seal the bores against the passage of the gas, either between the needle and the walls of the bores 30 and 31 during the operation of inflation, or through the bore passages when unoccupied by the inflating needle.

In the modified construction embodying our invention, shown in Fig. 6, parts corresponding to those described above and shown in Figs. 1 to 5 are designated by the same numerals to which is added the suffix letter "a". In this construction the centralization of the valve housing in the outer cover 12a is effected not by a neck formed on the upper end of the core body, but by a neck 36 which is formed at its lower end with an annular flange 37 which tapers radially outwardly in radial cross section. This flange has an outer spherical surface to conform to the outer surface of bladder 11a and an inner substantially plane surface adapted to fit upon and be secured to the similar plane upper surface of annular flange 17a of valve housing 13a by vulcanization or adhesive means. In assembling the parts of this modified form of valve construction, the housing 13a, bladder 11a and cover 12a are assembled and permanently united by vulcanization or otherwise. The valve core 23a is then inserted in the valve housing. The neck 36 with its flange 37 is then placed in position with flange 37 in contact with flange 17a and neck 36 in contact with neck 22a of the core 23a. Outer end 28a of the valve neck 36 is cut off flush with the outer surface of the cover 12a. The neck 36 is formed with an axial bore 38 which is somewhat larger in diameter than the bore 30a in order to facilitate the entrance of the inflating needle.

Fig. 7 shows a valve constructed in accordance with our invention assembled with a rubber ball having a single wall. Parts corresponding to those described above and shown in Figs. 1 to 5 are designated by the same numerals to which is added the suffix letter "b". Rubber wall 11b of the ball is thicker than the wall 11 of the bladder shown in Fig. 1 in order that the ball may resist puncture and the abrading effects incident to the use of the ball in play. The valve is constructed the same as that shown in Fig. 1. This figure also shows the manner in which the valve functions during the process of inflation of the ball. A hollow inflating needle 40, supplied with air or other gas through an attached hose 41 (shown in dotted lines in Fig. 7), is introduced into bore 30b and forced through the valve core, passing successively through the bore 30b, cavity 29b, bore 31b, opening 24b, and on into the interior of the ball. The air or gas is then passed through the bore of the needle and issues from an aperture 42 at the lower end of the needle.

As the needle travels across the cavity 29b some of the glycerine 35b stored in the cavity adheres to the needle and is carried downwardly therewith and acts both to facilitate the movement of the needle through the bore 31b and to prevent the passage of air backward between the needle and the interior wall of the bore. Similarly, when the needle is withdrawn the glycerine again lubricates the needle in its movement through the bore 30b and assists in sealing both bores 30b and 31b against leakage of the inflating gas from the ball interior.

Fig. 8 shows a modified form of valve core. Core 23c is made in two parts, an upper part 23' and a lower part 23", which abut each other in a plane bisecting the cavity 29c. A thin rubber envelope 43 extending from neck 22c down around the outer cylindrical walls of the parts 23' and 23" and across the lower end of part 23" serves to hold the two core parts in assembled position. It is provided with a small aperture 44 to permit insertion of the inflating needle. Rubber bands 33c encircle the envelope 43 which conforms to grooves under the constrictive action of the bands. In this modified form of valve core, we prefer to make bores 30c and 31c by casting the core parts in solid form and thereafter forcing a piercing tool axially through them.

By this bi-partite construction of the valve core, the manufacture of the core is more readily accomplished. Glycerine 35c is placed in the lower hemispherical half of the cavity 29c formed in core part 23". Core part 23' is placed in position upon core part 23". The envelope 43 is slipped over the two core parts, and tied thereon with the bands 33c. The core parts are then axially pierced to provide the bores 30c and 31c.

While we have shown and described several embodiments of our invention we do not wish to be limited to these specific constructions, but have defined our invention in the following claims.

We claim as our invention:

1. In an inflating valve, the combination of: an outer housing formed with an interior cylindrical chamber having end walls transverse of the axis of said chamber and an opening in each of said end walls; and a rubber valve core formed with a gas passage therethrough, said core snugly fitting within said chamber and having two walls arranged transversely of the axis of said chamber and engaging said end walls respectively, the distance between said transverse walls when said core is not longitudinally compressed being of normally greater length than the distance between said end walls, whereby, when said valve structure is assembled, said core is longitudinally compressed and shortened.

2. In an inflating valve, the combination of: an elastic valve member formed with a longitudinal gas passage and an enlarged, relatively short cavity disposed in said gas passage; a viscous non-plastic liquid having the physical properties of glycerine disposed in said cavity; and means for constricting said valve member to close said gas passage.

3. In an inflating valve, the combination of: an outer valve housing formed with a longitudinally arranged interior chamber; and an inner elastic core disposed within said chamber and formed with a longitudinal gas passage and an enlarged, relatively short cavity disposed along said gas passage intermediate of its ends, the housing and core being shaped and dimensioned to effect a reduction of the diameter of said cavity when said core is introduced into said housing.

4. In an inflating valve, the combination of: an elastic outer valve housing formed with a longitudinally arranged interior chamber; and an inner elastic core disposed in said chamber and formed with a longitudinal gas passage and an enlarged, relatively short cavity disposed along said gas passage intermediate of its ends, said housing and core being shaped so that when said core is introduced into said housing a centripetally directed, constrictive force is exerted upon the core tending to reduce the diameter of said cavity, said cavity having a viscous liquid disposed therein.

5. The combination in an inflating valve of: a bipartite valve member formed with a longitudinal gas passage through both parts of said valve member and an enlarged, relatively short cavity disposed along said gas passage, the meeting faces of the two parts of said member being disposed in a plane across the axis of said gas passage and intersecting said cavity; and a thin membranous, elastic envelope surrounding said parts and provided with openings registering with the ends of said gas passage.

6. In an inflating valve, the combination of: an outer housing of rubber formed with an interior chamber having lateral walls and end walls, each of said end walls having an opening therein; and a rubber valve core having a cross-sectional area of similar shape and greater dimensions than that of said interior chamber and with transverse faces fitting within said end walls, the distance between said transverse faces being normally greater than the distance between said end faces, said core being formed of two contiguously placed parts, each having an axial bore and a depression formed on and centrally of that face which contacts the other part, said depressions forming, when said parts are assembled, a completed cavity communicating with said bores.

7. In an inflating valve, the combination of: an upper, centrally bored rubber valve core; a lower, centrally bored rubber valve core; a jacketing means for holding said cores in axially aligned relationship; and two localized means associated with said jacketing means and each pressing inwardly upon an associated one of said cores intermediate its ends and adapted to prevent longitudinal displacement of said core relative to said jacketing means, said cores and jacketing means being shaped and dimensioned to provide a chamber between said cores.

WILLIAM J. VOIT.
LEITH C. WEIMER.